US008775074B2

(12) United States Patent
Samsalovic et al.

(10) Patent No.: US 8,775,074 B2
(45) Date of Patent: Jul. 8, 2014

(54) METHOD AND SYSTEM FOR REFRESHING LOCATION CODE DATA

(75) Inventors: Vojislav Samsalovic, Chicago, IL (US); Paul M. Bouzide, Chicago, IL (US)

(73) Assignee: Navteq B.V., Veldhoven (NL)

( * ) Notice: Subject to any disclaimer, the term of this patent is extended or adjusted under 35 U.S.C. 154(b) by 378 days.

(21) Appl. No.: 12/362,767

(22) Filed: Jan. 30, 2009

(65) Prior Publication Data

US 2010/0194605 A1 Aug. 5, 2010

(51) Int. Cl.
*G01C 21/12* (2006.01)
*G08G 1/123* (2006.01)
*G06F 9/44* (2006.01)

(52) U.S. Cl.
USPC ........... 701/450; 701/451; 701/452; 701/532; 340/995.1; 340/995.11; 340/995.12; 717/170

(58) Field of Classification Search
USPC ........................................................ 340/995
See application file for complete search history.

(56) References Cited

U.S. PATENT DOCUMENTS

| | | | |
|---|---|---|---|
| 6,202,023 B1 | 3/2001 | Hancock et al. | |
| 6,330,453 B1 | 12/2001 | Suzuki et al. | |
| 6,453,233 B1 * | 9/2002 | Kato | 701/451 |
| 6,487,495 B1 * | 11/2002 | Gale et al. | 701/461 |
| 6,538,674 B1 | 3/2003 | Shibata et al. | |
| 6,876,921 B2 | 4/2005 | Omi | |
| 6,912,545 B1 | 6/2005 | Lundy et al. | |
| 6,970,782 B2 * | 11/2005 | Watanabe et al. | 701/532 |
| 6,989,765 B2 | 1/2006 | Gueziec | |
| 7,161,497 B2 | 1/2007 | Gueziec | |
| 7,281,021 B2 | 10/2007 | Shiota et al. | |
| 7,373,247 B2 | 5/2008 | Park | 701/208 |
| 7,487,114 B2 * | 2/2009 | Florance et al. | 705/27.2 |
| 7,557,730 B2 | 7/2009 | Gueziec | |
| 7,564,375 B2 | 7/2009 | Brinton et al. | |
| 7,584,049 B2 * | 9/2009 | Nomura | 701/425 |
| 7,649,838 B2 | 1/2010 | Fishteyn et al. | |
| 7,720,596 B2 | 5/2010 | Kobuya et al. | |
| 7,805,442 B1 | 9/2010 | Joshi et al. | |

(Continued)

FOREIGN PATENT DOCUMENTS

CN 101154222 4/2008
CN 101319911 12/2008

(Continued)

OTHER PUBLICATIONS

European Search Report for EP10250102.0, dated Jul. 8, 2010.

(Continued)

*Primary Examiner* — Jennifer Mehmood
*Assistant Examiner* — John Mortell
(74) *Attorney, Agent, or Firm* — Lempia Summerfield Katz LLC

(57) ABSTRACT

A method and system for refreshing location code data is disclosed. The system includes a location code change system that receives map change data and location code change data. The location code change system processes the map change data, finds affected location codes, and updates the location code's information by manipulating the location code data or performing a geocoding operation. The updated location code data is stored in a location code system. The location code change system receives the location code change data from the location code system and provides information regarding the location code changes to a map change system, which facilitates map updates based on the location code changes.

19 Claims, 6 Drawing Sheets

(56) References Cited

U.S. PATENT DOCUMENTS

| | | |
|---|---|---|
| 7,920,965 B1 | 4/2011 | Nesbitt et al. |
| 8,065,291 B2 | 11/2011 | Knorr |
| 2001/0027375 A1 | 10/2001 | Machida et al. |
| 2001/0051973 A1 | 12/2001 | Green et al. |
| 2002/0023010 A1 | 2/2002 | Rittmaster et al. |
| 2002/0070934 A1 | 6/2002 | Sakamoto et al. |
| 2003/0135304 A1* | 7/2003 | Sroub et al. .................. 701/1 |
| 2003/0158668 A1 | 8/2003 | Anderson |
| 2003/0171870 A1 | 9/2003 | Gueziec |
| 2004/0030490 A1 | 2/2004 | Hegedus et al. |
| 2004/0044752 A1* | 3/2004 | Hamaguchi et al. .......... 709/220 |
| 2004/0122846 A1 | 6/2004 | Chess et al. |
| 2005/0060312 A1 | 3/2005 | Curtiss et al. |
| 2005/0060313 A1 | 3/2005 | Naimat et al. |
| 2005/0096849 A1 | 5/2005 | Sorrells |
| 2005/0149257 A1 | 7/2005 | Linkohr .................. 701/208 |
| 2005/0165743 A1 | 7/2005 | Bharat et al. |
| 2006/0026170 A1 | 2/2006 | Kreitler et al. |
| 2006/0149800 A1 | 7/2006 | Egnor et al. |
| 2006/0158330 A1 | 7/2006 | Gueziec |
| 2006/0230452 A1 | 10/2006 | Field |
| 2007/0027591 A1 | 2/2007 | Goldenberg et al. |
| 2007/0038646 A1 | 2/2007 | Thota |
| 2007/0106455 A1 | 5/2007 | Fuchs |
| 2007/0143345 A1 | 6/2007 | Jones et al. |
| 2007/0146374 A1 | 6/2007 | Riise et al. |
| 2007/0150516 A1 | 6/2007 | Morgan et al. |
| 2007/0239648 A1 | 10/2007 | Thota |
| 2007/0260628 A1 | 11/2007 | Fuchs et al. |
| 2007/0288518 A1 | 12/2007 | Crigler et al. |
| 2007/0294031 A1 | 12/2007 | Brinton et al. |
| 2008/0005275 A1 | 1/2008 | Overton et al. |
| 2008/0022003 A1 | 1/2008 | Alve |
| 2008/0133124 A1 | 6/2008 | Sarkeshik |
| 2008/0214300 A1 | 9/2008 | Williams et al. |
| 2008/0228391 A1 | 9/2008 | Sarkeshik |
| 2008/0228392 A1 | 9/2008 | Fuchs |
| 2008/0256039 A1 | 10/2008 | Chang et al. |
| 2008/0256060 A1 | 10/2008 | Chang et al. |
| 2008/0270209 A1 | 10/2008 | Mauseth et al. |
| 2008/0319670 A1 | 12/2008 | Yopp et al. |
| 2009/0043498 A1 | 2/2009 | Maethner |
| 2009/0049038 A1 | 2/2009 | Gross |
| 2009/0070379 A1 | 3/2009 | Rappaport |
| 2009/0088967 A1 | 4/2009 | Lerner et al. |
| 2009/0143984 A1 | 6/2009 | Baudisch et al. |
| 2009/0216435 A1 | 8/2009 | Zheng et al. |
| 2009/0216438 A1 | 8/2009 | Shafer |
| 2009/0299824 A1 | 12/2009 | Barnes, Jr. |
| 2009/0303036 A1 | 12/2009 | Sahuguet |
| 2009/0319188 A1 | 12/2009 | Otto |
| 2010/0063877 A1 | 3/2010 | Soroca et al. |
| 2010/0211307 A1 | 8/2010 | Geelen |

FOREIGN PATENT DOCUMENTS

| | | |
|---|---|---|
| JP | H10229577 | 8/1998 |
| JP | H11224047 | 8/1999 |
| JP | 2001075967 | 3/2001 |
| JP | 2001134595 | 5/2001 |
| JP | 2001243595 | 9/2001 |
| JP | 2002041554 | 2/2002 |
| JP | 2002/333830 | 11/2002 |
| JP | 200233830 | 11/2002 |
| JP | 2004191419 | 7/2004 |
| JP | 2005025291 | 1/2005 |
| JP | 2005291872 | 10/2005 |
| JP | 2007089196 | 4/2007 |
| JP | 2007147567 | 6/2007 |
| JP | 2007193066 | 8/2007 |
| JP | 2008096706 | 4/2008 |
| JP | 2009003838 | 1/2009 |
| WO | WO2006/074056 | 7/2006 |
| WO | WO2006/105754 | 10/2006 |
| WO | WO2007131044 | 11/2007 |
| WO | WO2008/154571 | 12/2008 |

OTHER PUBLICATIONS

European Search Report for EP 10250100.4-1236, dated Mar. 16, 2012.
Wubbahed.com, Importing Google Maps to your Nokia N95 (Jun. 29, 2007), http://wubbahed.com/2007/06/29/importing-mogle-maps-to-your-nokia-n95/.
European Search Report for EP 10250101.2 dated Jul. 6, 2010.
Priedhorsky, et al. "The Computational Geowiki: What, Why and How." GroupLens Research, Department of Computer Science and Engineering, University of Minnesota. Paper presented at Computer Supported Cooperative Work Conference. 2008.
Chinese Office Action for related application No. 201010107813.2 mailed Dec. 19, 2012.
Chinese Office Action issued in Chinese Application No. 201010107831.0, mailed Jun. 20, 2013.
Chinese Office Action cited in CN Application No. 201010107846.7, mailed Sep. 2, 2013.
Chinese Office Action for related Chinese Application No. 201010107866.4, mailed Jan. 7, 2013.
Chinese Office Action in Chinese Application No. 201010107813.2, mailed Oct. 22, 2013.
European Search Report for European Application No. EP 13155460, mailed Oct. 30, 2013.
Chinese Office Action in Chinese Application No. 201010107887.6, mailed Apr. 2, 2013.
Chinese Office Action issued in Application No. CN201010107866.4, mailed Nov. 22, 2013.
Japanese Office Action issued in Application No. JP2010-034052, mailed Nov. 27, 2013.
Japanese Office Action issued in Application No. JP2010-034054, mailed Nov. 15, 2013.
Japanese Office Action for JP Application No. 2010-034053, mailed Oct. 23, 2013.

* cited by examiner

METHOD AND SYSTEM FOR REFRESHING LOCATION CODE DATA

REFERENCE TO RELATED APPLICATIONS

The present patent application is related to the copending patent applications filed on the same date, Ser. No. 12/362,734, entitled "METHOD AND SYSTEM FOR ASSESSING QUALITY OF LOCATION CONTENT," Ser. No. 12/362,751, entitled "METHOD AND SYSTEM FOR MANAGING RELATIONSHIPS BETWEEN LOCATION IDENTIFIERS," Ser. No. 12/362,786, entitled "METHOD FOR REPRESENTING LINEAR FEATURES IN A LOCATION CONTENT MANAGEMENT SYSTEM," and Ser. No. 12/362,807, entitled "METHOD AND SYSTEM FOR EXCHANGING LOCATION CONTENT DATA IN DIFFERENT DATA FORMATS."

FIELD

The present invention relates generally to location-based systems, and more particularly, relates to a method and system for refreshing location code data.

BACKGROUND

Various technologies have been developed that provide navigation-related and map-related services. For example, vehicle navigation systems can determine where a vehicle is located and provide directions to travel to a desired destination. Also, Internet sites are available that provide maps, directions for traveling to a desired destination from a specified starting point, and other map-related services. Further, hand-held devices are available that can determine one's position and provide a map of one's surroundings.

In order to provide these and other map-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at road intersections, direction restrictions, such as one-way streets, and so on. Additionally, the geographic data may include data associated with points of interest, such as restaurants, hotels, airports, gas stations, stadiums, police stations, and so on.

This geographic data may be stored in a geographic database, such as a geographic database published by NAVTEQ North America, LLC of Chicago, Ill. In addition to the data obtained by a map vendor, content sources have data regarding locations in a geographic area. The content sources may provide their data to the map vendor for inclusion into the geographic database. For example, an owner of a chain restaurant may provide the map vendor with a current list of all their locations and for each of the locations the list may include address, telephone numbers, hours of operation, menu, web page address, and other information about the location.

As the amount of information stored in a geographic database increases, it becomes more difficult for the map vendor to add the third party data to the geographic database. As a result, location content management systems have been developed to allow multiple parties to provide data related to a location, which is sometimes referred to as "location content" or simply "content." The location content management system provides a link between the location content and the geographic location associated with the content. The link is a location code that the location content management system assigns to a location.

A location code may be assigned to any location where a person can travel. For example, a person may want to travel to a particular office on a particular floor in a particular building in a geographic region. Using this example, the location content management system assigns a location code to each of the office, floor, and building. The location content management system may also assign a location code to stairs and/or an elevator if the floor is not on the ground level of the building. By assigning location codes in this manner, a navigation system can provide route guidance to a user for traveling to the office within the building.

While the location content management system provides a way for multiple parties to provide content regarding a location, there continues to be room for new features and improvements in the location content management system. One area for improvement is updating location code data. The location code data includes geographic reference data and map reference data. By refreshing the location code data frequently, users of the location code data are more likely to obtain accurate data.

SUMMARY

A method and system for refreshing location code data is disclosed. The system includes a location code change system. The location code change system obtains map changes from a map change system and location code changes from a location code system. The map change system obtains map changes from a map system.

The location code change system determines whether a map change impacts a location code. If a location code is impacted, the location code change system retrieves the affected location code and makes the appropriate changes to the associated location code data either by directly manipulating the location code data or by performing a geocoding operation. The geocoding operation may be a forward geocoding operation (i.e., location code contains address information) or a reverse geocoding operation (i.e., location code does not contain address information).

When the location code change system receives a location code change from the location code system, the location code change system determines whether the location code change should be sent to the map change system for updating the map data. If forwarded, the map change system sends a map update request to the map system so that the map system can make the appropriate changes to the map data.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
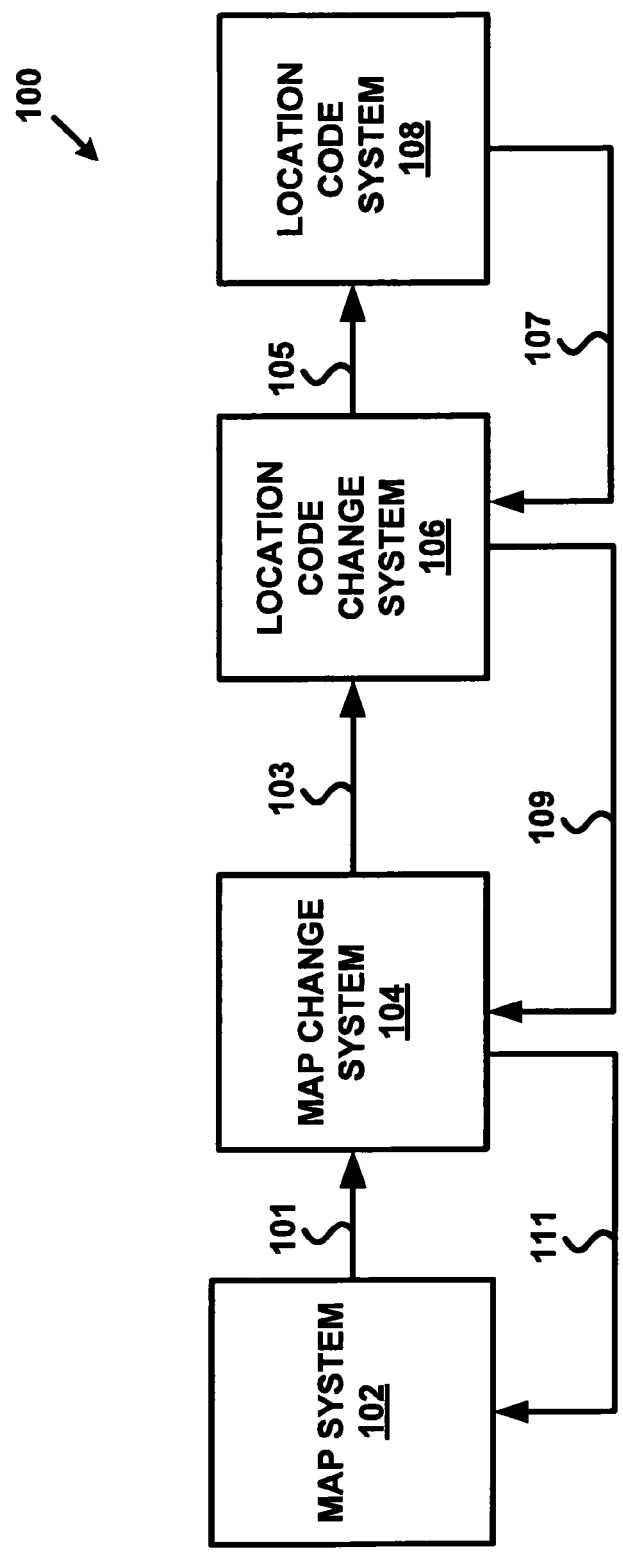
FIG. 1 is a block diagram of a data refresh system, according to an example.

FIG. 1 is a block diagram of a data refresh system 100. The data refresh system 100 includes a map system 102, a map change system 104, a location code change system 106, and a location code system 108. The data refresh system 100 updates location code data as well as map data so that users of this data can obtain frequently refreshed data.

The map system 102 provides storage, programs, and interfaces for adding, updating, and deleting map data. Map vendors can have different implementations of the map system 102 depending on their map data model and processes that govern map creation and editing procedures. While one map system is depicted in FIG. 1, it is understood that each map vendor may have its own map system.

The map system 102 sends map changes to the map change system 104 via a data connection 101. The map changes may include new, updated, and deleted map data. The data connection 101 may be any type of wired or wireless connection that is operable to transport the map changes from the map system 102 to the map change system 104. The data connection 101 may transport map changes continuously or intermittently, based on a predefined schedule or manual request.

Figure 2:
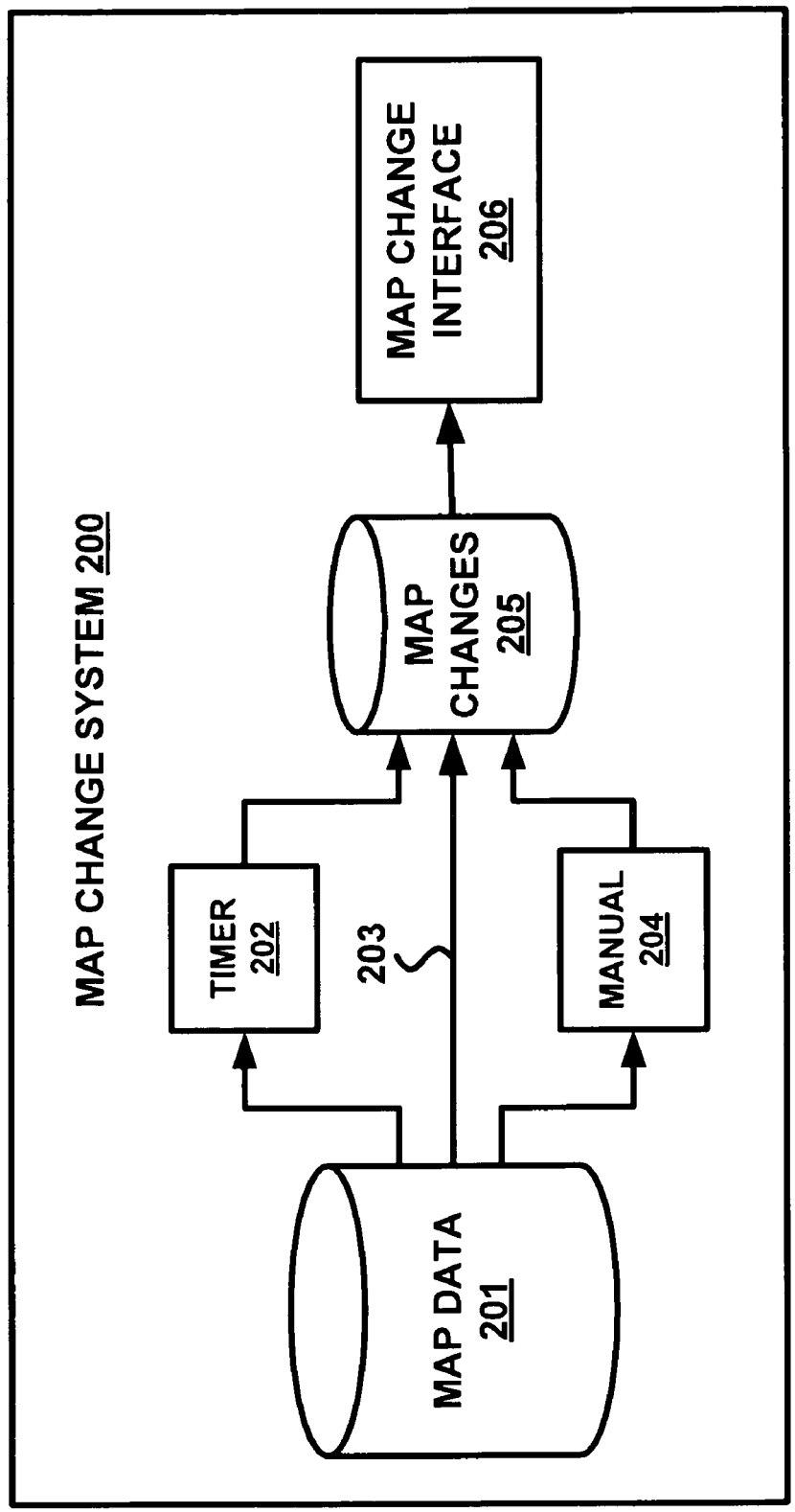
FIG. 2 is a block diagram of a map change system, according to an example.

The map change system 104 handles map changes received from the map system 102 via the data connection 101. The map change system 104 stores and manipulates changed map data as necessary for delivering map changes to internal and/or external systems. The map change system 104 may also be used for handling requests to change the map data. An example of a map change system 104 is depicted in FIG. 2.

One of the external systems receiving map changes from the map change system 104 is the location code change system 106. The map change system 104 uses a data connection 103 for sending changed map data to external systems. The data connection 103 may be any type of wired or wireless connection that is operable to transport the map changes from the map change system 104 to the location code change system 106.

The data connection 103 enables push and pull mechanisms for sending map changes to external systems, such as the location code change system 106. Additionally, the data connection 103 allows for a number programmatic and human interfaces, as well as transport mechanisms, for requesting and sending map changes over wired and wireless networks. Different network protocols can be utilized to deliver map changes over Intranet and Internet networks. The data connection 103 also performs all the necessary data compression and encryption before sending information to internal and external consumers.

Figure 3:
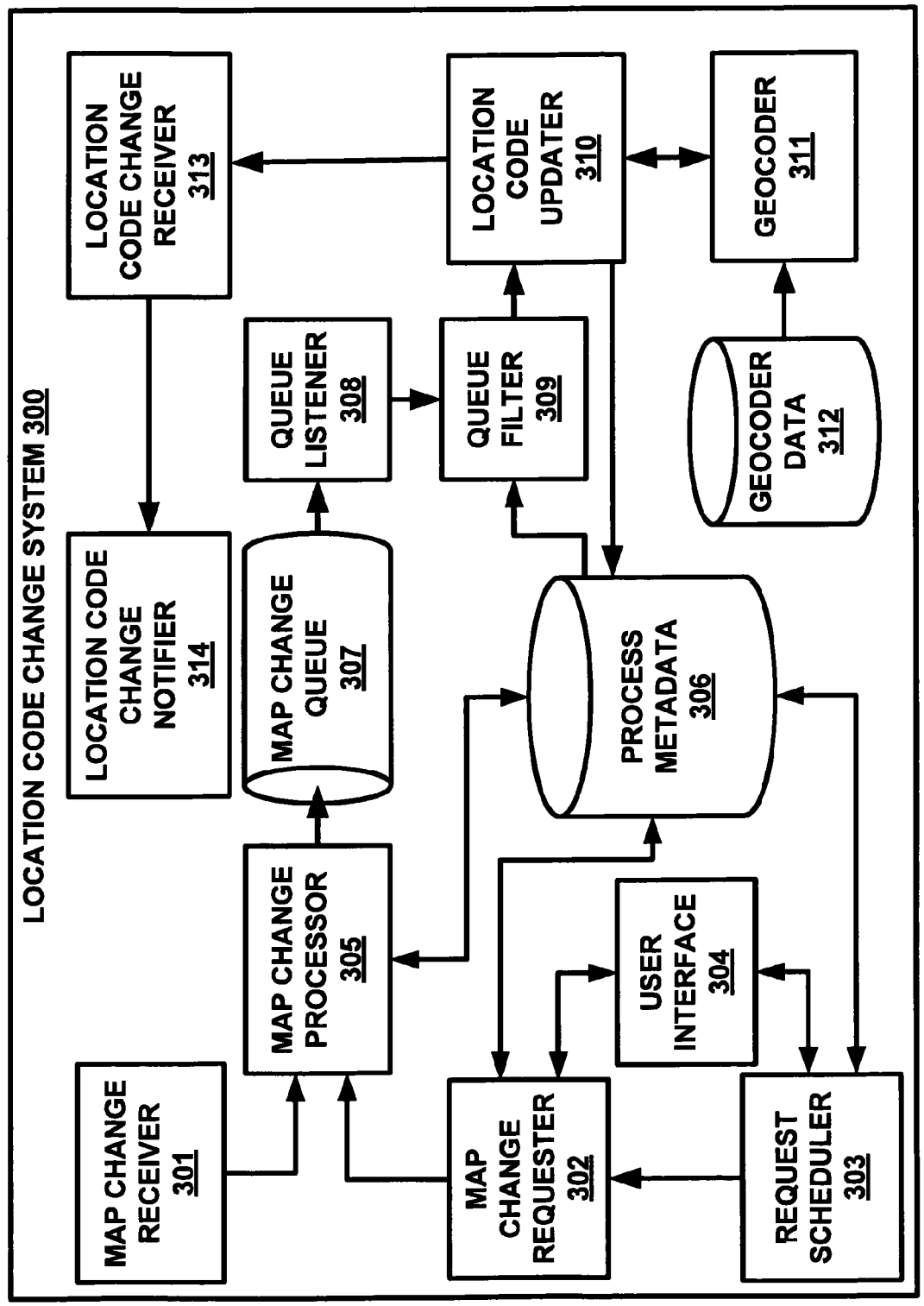
FIG. 3 is a block diagram of a location code change system, according to an example.

The location code change system 106 refreshes location code data based on map changes. The location code change system 106 provides updated location code data to the location code system 108 via a data connection 105. The data connection 105 may be any type of wired or wireless connection that is operable to transport the location code changes from the location code change system 106 to the location code system 108. For example, the location code change system 106 sends map reference and geographic reference updates to the location code system 108 via the data connection 105. The data connection 105 is preferably optimized for high throughput and low latency networks in order to quickly deliver updates to location code data. An example of a location code change system 106 is depicted in FIG. 3.

Figure 5:
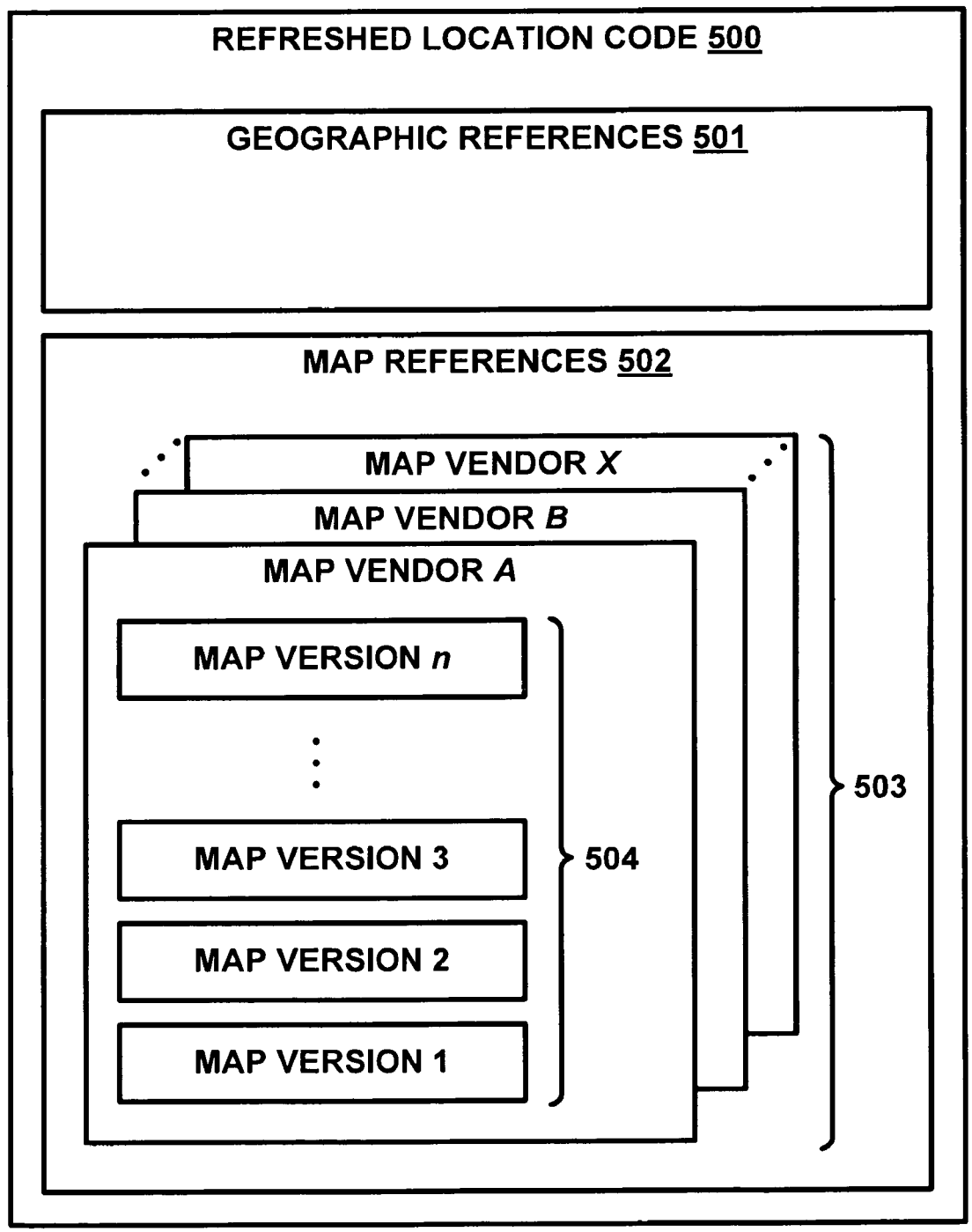
FIG. 5 is a block diagram of a location code entity, according to an example.

The location code system 108 is a combination of hardware, software, and/or firmware that stores and maintains the location code data. For example, the location code system 108 includes memory that stores a data structure for the location code data. The memory may be any type of memory that allows read/write access. Similarly, any type of data structure may be used. An example of a location code entity that may be stored in the memory in the location code system 108 is depicted in FIG. 5.

The location code change system 106 receives location code data changes that occur in the location code system 108 via data connection 107, which may be any type of wired or wireless connection suitable for data transfers. The data connection 107 is preferably optimized for high throughput and low latency networks, but the data connection 107 may also send updates over slower networks. Additionally, the data transport is preferably non-transactional so no additional overhead is placed on the location code system 108 to support Wide Area Network (WAN) connections, which may be slower and less reliable.

Some of the location code changes may be used to change the map data by notifying the map change system 104 via data connection 109. The data connection 109 may be any type of wired or wireless connection that is operable to transport the location code changes from the location code change system 106 to the map change system 104. For example, an expert community may change location code data and map references in order to fix positional accuracy of a location code. That change may be accepted by the location code system 108, which in turn notifies the location code change system 106 via data connection 107.

The location code change system 106 then determines whether this change should also be communicated to the map change system 104 in order to update the map. The map change system 104 receives the change information via the data connection 109 and transforms the information into a map update request that is compatible with the map system 102. The data connection 109 may also perform data encryption and/or data compression to securely and efficiently transmit requests for map updates.

Data connection 111 is used to send map updates to the map system 102 if the map change system 104 accepts requests received through the data connection 109. The data connection 111 may be any type of wired or wireless connection that is operable to transport the map updates from the map change system 104 to the map system 102. The data connection 111 is preferably optimized for high throughput and low latency networks in order to quickly deliver map update information. The data connection 111 may also provide transactional support for delivery of information.

FIG. 2 is a block diagram of an example map change system 200 that may be used as the map change system 104 depicted in FIG. 1. Other map change system designs may also be used. The map change system 200 includes a map data store 201, a timer 202, a data connection 203, a manual data transfer component 204, a map changes data store 205, and a map change interface 206. The map change system 200 may have other components as well.

The map data store 201 contains map data that is in a specific map vendor format. The map data may be stored in a relational database format, file based format, or any other data format that is appropriate for permanent data storage. The map data store 201 contains either live production map data or a copy of the production map data. Preferably, the data schema used in the map data store 201 is in sync with the data schema in the map system 102.

The timer 202 is used to create schedules for retrieving and sending map changes. The timer 202 starts and stops the process of sending the map changes to the map changes store 205. In case of a failure, the timer component 202 logs the error, notifies a system administrator, and/or attempts to restart the process.

The data connection 203 is used to stream map changes from the map data store 201 to the map changes store 205. Preferably, the map data store 201 continuously streams map changes to the map changes store 205; however, the map changes may be provided to the map changes store 205 in a non-continuous manner as well. The data connection 203 is preferably optimized for high throughput and low latency networks with a guaranteed data delivery mechanism. Different technologies may be used to transmit only the delta information that is sufficient to describe each change. The map data may be compressed for more efficient delivery.

The manual data transfer component 204 may be used to manually initiate processes for retrieving and sending map changes. The manual data transfer component 204 has a set of programmatic and/or human interfaces that may be used to start and stop the process of sending the map changes to the map changes store 205.

The map changes data store 205 stores data that describes map changes. The map changes data store 205 may keep map changes in a relational database format, flat and hierarchical file format, or any other data format that is appropriate for permanent data storage. The map changes data store 205 is preferably optimized for efficient data access in chronological order.

The map change interface 206 is a set of programmatic and/or human interfaces that can be used to retrieve map changes. The map change interface 206 preferably supports both push and pull mechanisms for retrieving map changes. Internal and/or external entities can register to automatically receive changed map data based on one or more selected criteria. For example, an external system may register to receive map updates when new road geometry is added in user-defined geographic area. Pull based APIs are suitable for users who want to extract map changes on demand (ad-hoc), without previously defined criteria. These APIs are better suited for exchange of smaller data sets, especially when external systems are accessing them via Wide Area Networks (WAN). Both push and pull interfaces and APIs allow for secure and transactional delivery of map changes.

FIG. 3 is a block diagram of an example location code change system 300 that may be used as the location code change system 106 depicted in FIG. 1. Other location code change system designs may also be used. The location code change system 300 includes a map change receiver 301, a map change requester 302, a request scheduler 303, a user interface 304, a map change processor 305, a change process metadata repository 306, a map change queue 307, a queue listener 308, a queue filter 309, a location code updater 310, a geocoder 311, a geocoder data store 312, a location code change receiver 313, and a location code change notifier 314. The location code change system 300 may have other components as well.

The map change receiver 301 (referred to herein as the receiver 301) accepts map changes from the map change system 200 over the data connection 103. The receiver 301 "listens" to map change data by accepting data packets from the map change interface 206. The receiver 301 is preferably uniquely identifiable and accessible on a local or public network as there may be a number of physical components on the network accepting map changes. The receiver 301 performs authentication and authorization of the map change system 200 sending map updates.

Preferably, the receiver 301 is capable of receiving map updates from different map vendors at the same time. Additionally, the receiver 301 may also be capable of receiving map updates from different map versions at the same time. The map change system 200 identifies the map changes with map vendor and map version information. The map change system 200 and the receiver 301 form a push based mechanism for retrieving map changes. The data push can be performed as transactional or non-transactional operation.

The map change requester 302 (referred to herein as the requester 302) is responsible for requesting map changes from the map change system 200. The requester 302 interacts with the map change system 200 via the map change interface 206 to form a pull based mechanism for retrieving map changes. Preferably, the data requests are performed in transactional manner. The requester 302 issues requests that conform to the map change interface 206 specification. For each request, the requester 302 reads the process metadata repository 306 to form a valid request message. Successful requests are recorded in the process metadata repository 306 to avoid duplicate requests. Unsuccessful requests are logged and repeated attempts are made in order to retrieve expected map changes.

The request scheduler 303 (referred to herein as the scheduler 303) is used for creating and maintaining schedules for requesting map changes. The scheduler 303 stores schedule data in the process metadata repository 306. The scheduler 303 signals the requester 302 when it is time to issue a request for map changes. Different update schedules may be defined for each map data provider. Additionally, different update schedules may be specified for individual map versions within a single map provider. For example, a map provider can specify that map changes for Q1 2008 map version are retrieved every Sunday at 2:00:00.000 CST.

The user interface 304 is used by system operators and other authorized users to set up map change schedules and manually start and stop map change requests. The user interface 304 can be also used to monitor all running processes within the location code change system 300.

The map change processor 305 (referred to herein as the processor 305) transforms map change data delivered by the receiver 301 and the requester 302. The processor 305 pushes incoming data into a map change queue 307. The processor 305 updates the process metadata repository 306 and eliminates duplicate information if necessary. For example, if the same map data changed several times and the latest change contains all the necessary information, the processor 305 removes the previous changes. The processor 305 parses and normalizes change data to create a common map change data structure that is understandable by the rest of the system.

The process metadata repository 306 stores process data for avoiding duplicate requests, maintaining update schedules, and eliminating of stale data. The process metadata repository 306 may be implemented as a set of physical databases, but is shown in FIG. 3 as a single logical database for simplicity.

The map change queue 307 is a data structure that stores change messages before they are processed by the location code updater 310. The map change queue 307 holds messages in a common format that preserves change information, but abstracts variations in message structure between different map providers and map versions. In one example, the map change queue 307 adheres to FIFO (First-In-First-Out) principle. Of course, the map change queue 307 may use other rules for providing the change messages to the location code updater 310.

The queue listener 308 reads messages from the map change queue 307. While one queue listener 308 is depicted in FIG. 3, there may be more than one queue listener in the location code change system 300. For example, there may be a queue listener 308 for each type of map change message. Flexible configuration options allow creating additional listeners for a particular map vendor and/or map version.

The queue filter 309 disregards map changes that are not applicable to the location code data. The queue filter 309 checks against the process metadata repository 306 to obtain a list of applicable map change types. As a result, the location code change system 300 can be dynamically reconfigured to ignore or become aware of certain types of map change types. Map change messages that are ignored can be logged or returned back to the map change queue 307 based on the configuration stored in process metadata repository 306.

The location code updater 310 processes map change data, finds affected location codes, and updates the location code's information by either directly manipulating location code data (geographic or map references) or by performing forward or reverse geocoding operation. The geocoder 311 is used for performing the forward and reverse geocoding operations. Each geocoding request is accompanied with map vendor and map version information so that the geocoder 311 can find the applicable geocoding data in the geocoder data store 312. The geocoder 311 returns data that is used by location code updater 310 to update location codes' geographic and map references data.

The geocoder data store 312 is used for storing geocoding data. The geocoder data store 312 is in sync with the map changes so that the geocoder 311 can return updated geographic and map references. Each map vendor and map version can have a separate logical database.

The location code change receiver 313 receives location code data updates from the location code system 108. The location code change receiver 313 eliminates data that is not related to a particular change and formats data into a common format acceptable by other systems. The location code change notifier 314 (referred to herein as the notifier 314) receives location code update information from the location code change receiver 313. The notifier 314 maintains a list of systems that are interested in receiving notifications about specific location code updates. One of those systems may be the map change system 104.

Figure 4:
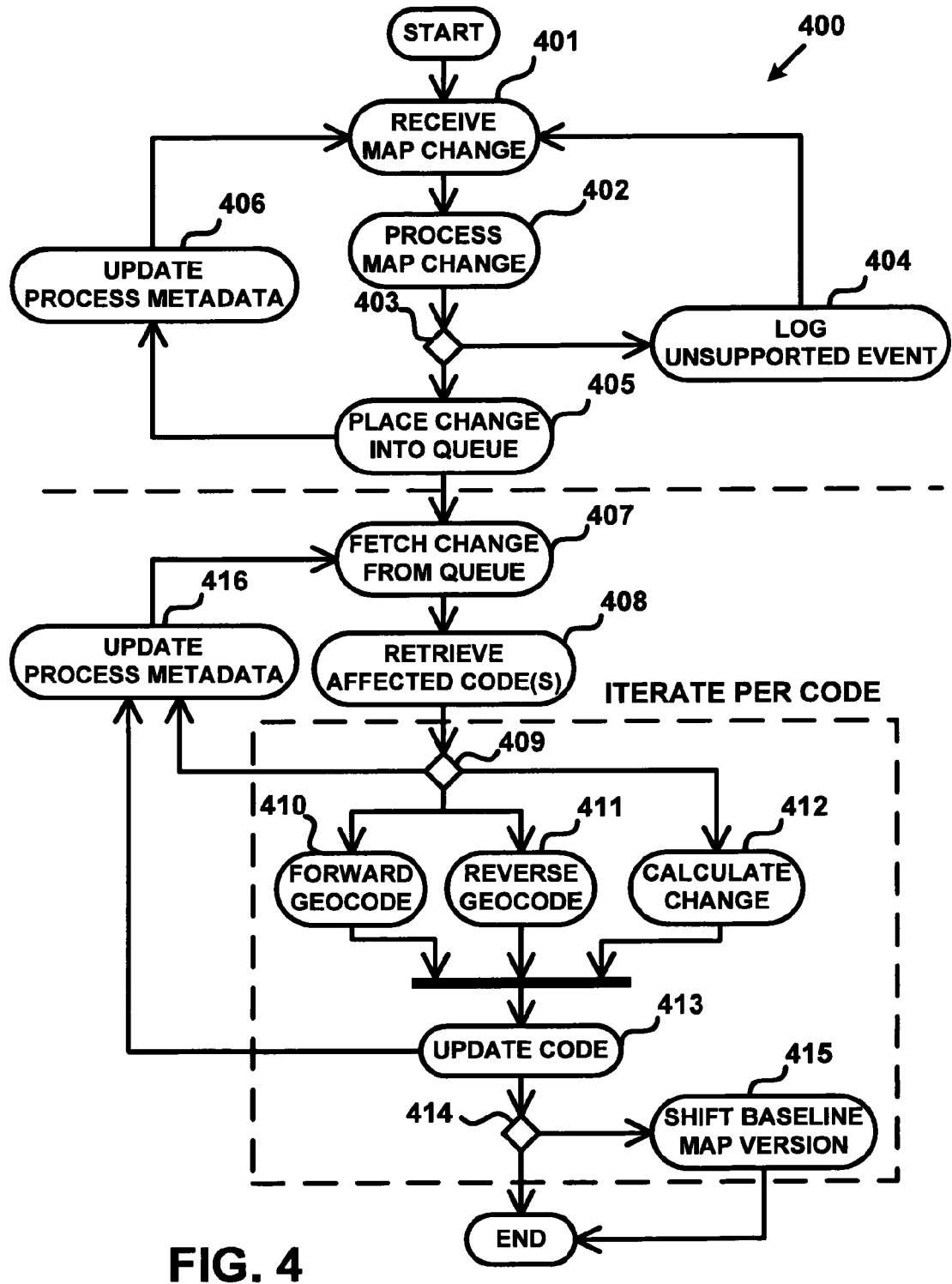
FIG. 4 is a flow chart of a data refresh process, according to an example.

FIG. 4 is a flow chart of a location code refresh process 400. At block 401, the map change receiver 301 receives a map change from the map change system 200. In addition, the map change receiver 301 performs message authentication and authorization steps to prevent unauthorized access to the location code change system 300. The authentication step determines any custom actions that need to be taken for a particular map vendor and map version. For example, a particular map vendor may be sending higher priority updates that need to be processed quicker than updates with normal or low priority.

At block 402, the map change processor 305 parses and normalizes the map change data according to map vendor and map version rules. The map change processor 305 also checks against the process metadata repository 306 to make a decision at block 403 on whether the received map change is relevant to the location code refresh process 400. If the received map change is recognized, but has no relevance to location code data, the received map change is simply ignored. If the received map change is not recognized, this event is logged through a log unsupported event action at block 404.

If the received map change is relevant to the location code refresh process 400, at block 405 the map change processor 305 places the normalized map change data in the map change queue 307. Each map vendor, map version, and/or map change type can have a separate message queue for easier system scaling and process prioritization. For example, if changes related to the latest map version need to be processed with the highest importance, the process metadata repository 306 can instruct the map change processor 305 to use a separate queue. These decisions can be made at runtime without redeploying or restarting any system components.

Upon successful placement of the map change data into the map change queue 307, at block 406 the map change processor 305 records event data in the process metadata repository 306. Updating the process metadata is done to avoid repeated processing of the same map change in case the map change system 200 sends the same information again.

The dashed line in FIG. 4 indicates that blocks 401 through 406 are repeated for every new map change received. Since these activities may be involved in processing large amounts of data, where only a small subset is used for location code updates, the location code refresh process 400 may be hosted on separate hardware.

At block 407, the queue listener 308 retrieves one or more map changes from the map change queue 307, depending on the rule for data fetching. If the location code refresh process 400 does not complete successfully, the map change message is placed back in the map change queue 307.

At block 408, the location code updater 310 analyzes the map change data to determine which location codes need to be updated. During this activity, map vendor, map version, and map change type are examined to determine how to collect affected location codes. For example, if map vendor A sends a map change event that a routing point for a point address defined in Q1 2008 map version moved from one set of coordinates to another, a location code that is associated with this point address is retrieved.

At block 409, the location code updater 310 determines whether to continue the process of refreshing location codes 400. The location code updater 310 continues if the map change affects at least one location code. If no location codes are affected, at block 416 the location code updater 310 updates the process metadata repository 306 and permanently removes map change message from the map change queue 307. If at least one location code is affected, the location code updater 310 performs a forward or reverse geocoding operation using the geocoder 311, or performs direct manipulation.

At block 410, the location code updater 310 performs a forward geocoding operation if affected location codes contain address information and location codes' map references cannot be updated based on the map change data. The forward geocoding operation uses geocoding data that is specific to a map vendor and/or map version.

At block 411, the location code updater 310 performs a reverse geocoding operation if affected location codes do not contain address information and location codes' map references cannot be updated based on the map change data. The reverse geocoding operation uses geocoding data that is specific to a map vendor and/or map version.

At block 412, the location code updater 310 determines how to update location codes without using any geocoding operations. The location code updater 310 determines the location code data change if the map change data provides enough details to conclude how location codes should be refreshed. For example, if a map change specifies that a road link was deleted and replaced with another road link, the location code updater 310 can reattach all location codes that were referencing the deleted link to the newly added link. Another example is a road name change. If one road changed its name due to a spelling error, the map change data can contain the old and the new road name. All location codes that are referencing the old road name can have their geographic references with new information without a call to the geocoder 311.

At block 413, the location code updater 310 creates or updates geographic and map references. The map references may contain unique information for each map vendor and map version. If a map change carries information about the map version or map vendor that does not exist in the map references section of the affected location code, a new map reference is created. For example, map vendor A has just released a new version of their map. In the new map version, a new point address was added. This point address provides higher positional accuracy than the previously defined address. The map references of the location code that points to this address is updated by adding point address data.

At block 416, the location code updater 310 updates the process metadata repository 306 and permanently removes map change message from the map change queue 307.

At block 414, the map change processor 305 determines whether the number of map versions in map references section exceeds a limit. Location codes can store map references for unlimited number of map versions. However, to eliminate the overhead of transmitting outdated map data, there may be a restriction on how many map versions are supported. The restriction may very from one map vendor to another. For example, for map vendor A, each location code may hold map references for up to eight map versions. For vendor B, each location code may hold map references for up to four map versions. At block 415, if the number of map versions stored in affected location code exceeds the limit, the map references from the oldest map version are shifted to the map version above. An example of a map version shift is depicted in FIG. 6.

FIG. 5 is a block diagram of a location code entity 500 that may be updated during the location code refresh process 400. The location code entity 500 includes a geographic references section 501 and a map references section 502. The geographic references section 501 includes addresses, location names, geographic point information (e.g., latitude, longitude, and altitude), as well as other information. The map references section 502 includes map information for one or more map vendors 503. For each map vendor 503, there can be data related to one or map versions 504.

Figure 6:
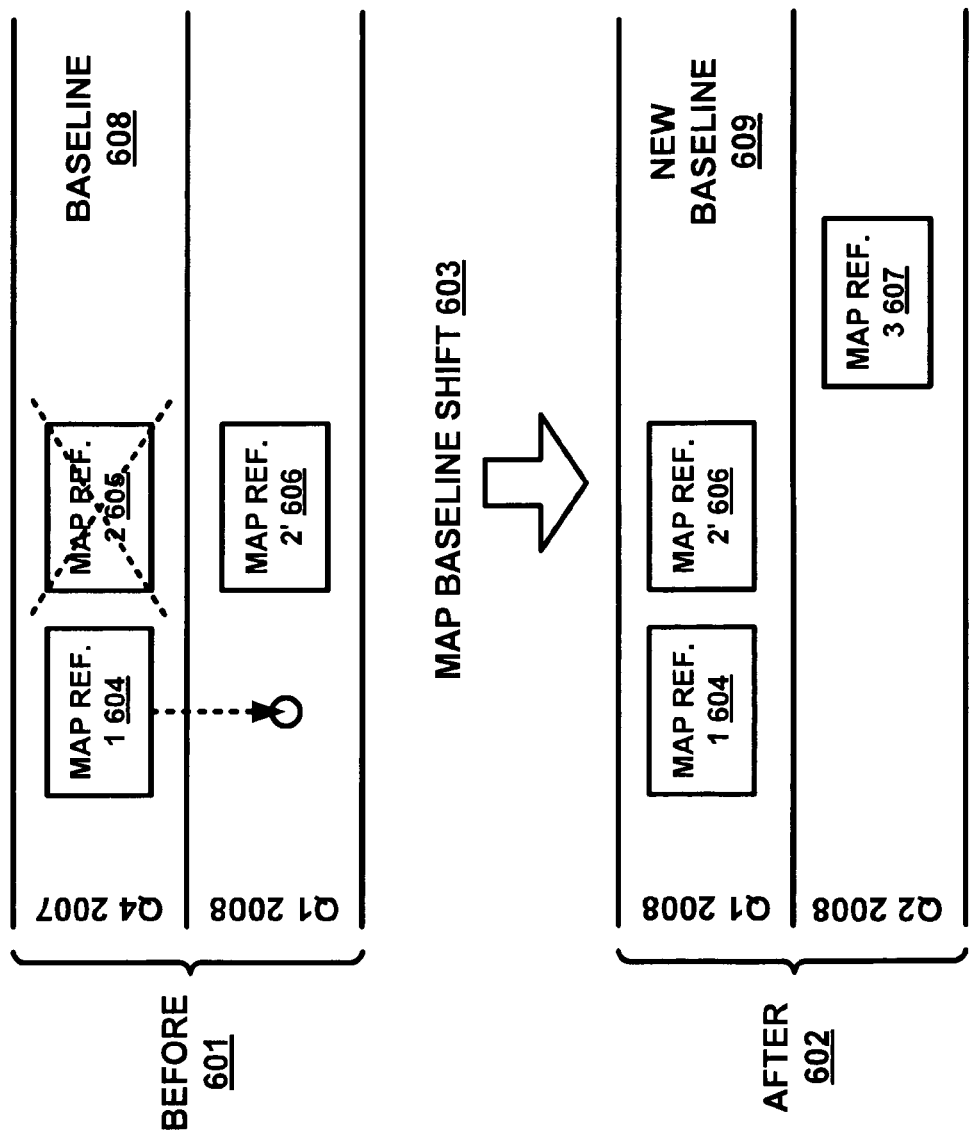
FIG. 6 is a process diagram for map baseline shifting, according to an example.

FIG. 6 is a schematic diagram that shows the changes that a map reference entity in the map references section 502 may undergo during a map baseline shift 603. Before the map baseline shift 603 starts, the map references 604, 605, 606 are in a before state 601. In this example, the oldest map version in the before state 601 is Q4 2007. For the Q4 2007 map version, there are two map references in use by this location code: the first map reference 604 and the second map reference 605.

The Q4 2007 map references form the baseline 608 that needs to be shifted to Q1 2008 map version data. Since there is no Q1 2008 data for the first map reference 604, the first map reference 604 is simply moved to Q1 2008 data. However, for the second map reference 605 there is updated information in Q1 2008: the updated second map reference 606. The second map reference 605 is deleted and the updated second map reference 606 remains for use in the baseline 608.

After the map baseline shift 603, the Q4 2007 map version is removed from the map references section 502 and the Q1 2008 map version is established as the new baseline 609. The Q1 2008 map version includes the first map reference 604 and the updated second map reference 606. The Q2 2008 data includes a third map reference 607 that was not previously included in the map references section 502. At the next baseline shift, the third map reference 607 is added to the next baseline version.

As a result of the communication between the map system 102, the map change system 104, the location code change system 106, and the location code system 108, the location code data is frequently updated. Beneficially, users of the location code data obtain current location code data for their uses. The map data is also updated when impacted by location code changes reducing the effort to maintain various geographic databases.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method of refreshing location code data, comprising:
receiving a first message identifying a first map vendor and a map version of a first map database, wherein the first message includes map change data in a format associated with the first map database and specifies a removed road link and a new road link;
receiving a second message identifying a second map vendor and a map version of a second map database, wherein the second message includes map change data in a format associated with the second map database;
converting the format associated with the first map database and the format associated with the second map database to a common format;
determining whether the map change data affects a location code stored in a location code system, wherein the location code links geographic coordinates to content for the first map vendor and the second map vendor;
updating location code data associated with the location code based on the map change data by removing a reference to the removed road link and attaching the new road link to the location code; and
storing the updated location code data in the location code system.

2. The method of claim 1, further comprising authenticating the first message to identify specifications for the first map vendor.

3. The method of claim 1, wherein determining whether the map change data of the first message affects the location code data includes examining the first map vendor, the map version of the first map database, and a map change type.

4. The method of claim 1, wherein uploading data for the location code includes performing a forward geocoding operation if the location code contains address information.

5. The method of claim 1, wherein updating location code data for the location code includes performing a reverse geocoding operation if the location code does not contain address information.

6. The method of claim 1, wherein updating data for the location code includes using the map change data to manipulate the location code data.

7. The method of claim 1, further comprising performing a map baseline shift if the location code data includes data for a number of map versions that exceeds a predetermined amount.

8. The method of claim 7, wherein the map baseline shift includes deleting the location code data for map version associated with an oldest date.

9. A location code change system used for refreshing location code data stored in a location code system, comprising:
- a map change receiver operable to receive messages that include map change data, wherein the map change data identifies a first map vendor and a first map version associated with the map change data and a second map vendor and a second map version associated with the map change data;
- a map change processor operable to transform the map change data obtained by the map change receiver into a common format compatible with the first map vendor and the second map vendor; and
- a location code updater operable to identify location codes affected by the map change data using the common format and update the affected location codes, wherein the location codes link geographic locations to location content and the location code updater is configured to send a message to the location code system that includes updated location code data.

10. The system of claim 9, further comprising a map change requester operable to request the map change data.

11. The system of claim 10, further comprising a map change scheduler operable to signal the map change requester to request the map change data.

12. The system of claim 9, further comprising a map change queue that stores the transformed map change data prior to the location code updater identifying the affected location codes.

13. The system of claim 9, further comprising:
- a geocoder operable to perform geocoding operations for the location code updater; and
- a geocoder data store configured to store geocoding data used by the geocoder.

14. The system of claim 9, further comprising a location code change receiver that receives messages from the location code system that includes location code change data.

15. A data refresh system for updating location code data, comprising:
- a map system that includes storage, programs, and interfaces for changing map data in a map database;
- a map change system that receives a plurality of messages from the map system that includes map change data, wherein each of the plurality of messages identifies a map vendor and a version number, wherein the map change system formats the map change data to be compatible for a plurality of map vendor formats, wherein the map change system identifies an action based on the map vendor and the version number;
- a location code change system that receives the formatted map change data from the map change system and updates location code data based on the formatted map change data, wherein the location code data links content to geographic locations; and
- a location code system that receives updated location code data from the location code change system.

16. The system of claim 15, wherein the location code system sends messages to the location code change system that includes location code change data.

17. The system of claim 16, wherein the location code change system sends the location code change data to the map change system.

18. The system of claim 17, wherein the map change system sends the location code change data to the map system.

19. The method of claim 1, wherein the location code is configured to allow multiple map vendors to update the content.

* * * * *